*Parrott & Bordman,*
*Cleaning Glass.*
No 77,834.   Patented May 12, 1868.
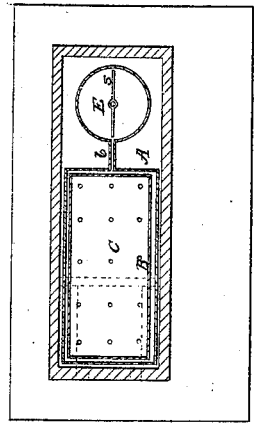
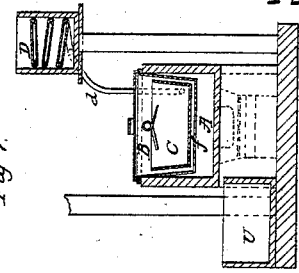
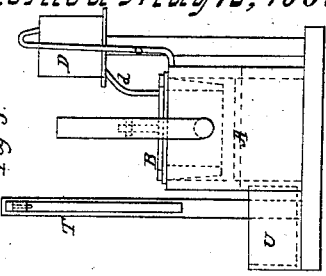
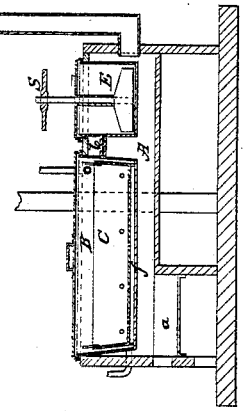
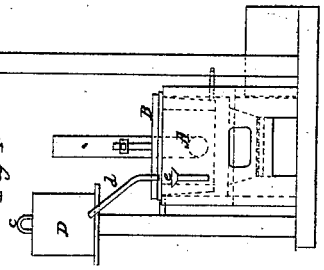
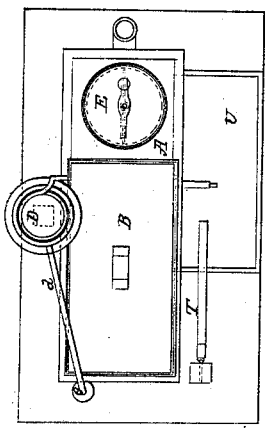
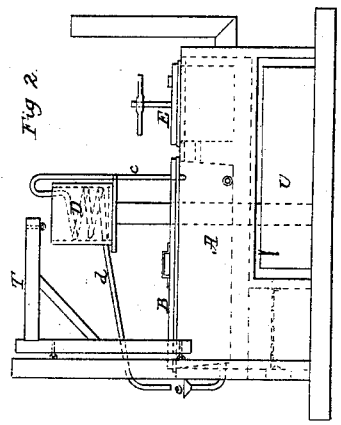
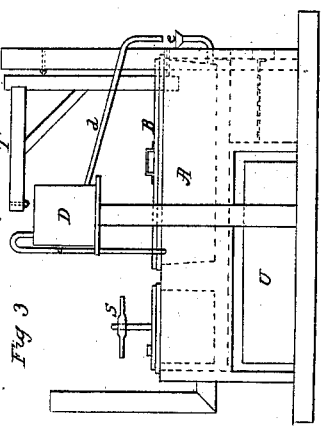
Witnesses;   Inventor;
W. P. Parrott & J. J. Bordman
by their attorney

United States Patent Office.

WILLIAM P. PARROTT, (GEORGE HUGHES, EXECUTOR,) AND JOHN J. BORDMAN, OF BOSTON, MASSACHUSETTS.

Letters Patent No. 77,834, dated May 12, 1868.

IMPROVED MODE OF REMOVING METALLIC SCALE FROM GLASS AND "MOILS."

The Schedule referred to in these Letters Patent and making part of the same.

TO ALL PERSONS TO WHOM THESE PRESENTS MAY COME:

Be it known that we, WILLIAM P. PARROTT and JOHN J. BORDMAN, of Boston, in the county of Suffolk, and State of Massachusetts, have made a new and useful Invention for Removing Metallic Scale from Glass or the "Moils" of Glass-Blowers' Pipes or Implements; and we do hereby declare the same to be fully described in the following specification, and represented in the accompanying drawings, of which—

Figure 1 denotes a top view,
Figure 2 a right side elevation,
Figure 3 a left side elevation,
Figure 4 a front end view,
Figure 5 a rear end elevation,
Figure 6 a longitudinal and vertical section,
Figure 7 a transverse section,
Figure 8 a horizontal section of the apparatus or mechanism used by us in carrying out our invention.

It is well known, in the process of blowing glass, that the waste glass which accumulates and sticks on the blow-pipe after the formation of an article thereby, when broken or knocked from the pipe, or from a ponty, carries with it, from the pipe or ponty, more or less of the metal thereof, or an oxide of such metal. This refuse glass usually goes by the name of "moils."

Before the moils can be remelted and utilized to advantage, it becomes desirable to remove from them these metallic incrustations, such being the object of our invention.

To accomplish this to the best advantage, we employ heat and a weak solution of fluoric acid and sulphuric or muriatic acid. The moils are to be placed in the solution, and there suffered to remain a sufficient period, heat being applied to it, so as to boil it in the mean time. After the metallic oxide or crust may have been removed by the action of the acids and heat, the moils may be washed.

Our process, and means employed in carrying it out, may also be employed for the purpose of separating a metallic oxide from sand used in the manufacture of glass.

To obtain the fluoric acid to advantage or economically, we employ fluor spar, on which we pour sulphuric acid and water, in or about in the proportion of one part, by weight, of the spar, eight parts of the acid, and thirty-two parts of water.

The apparatus we employ in our process, and represented in the accompanying drawings, we will now proceed to describe, and also to explain the mode of using it.

In such drawings, B denotes a boiler, pan, or covered vessel, set in brick-work, over a furnace, A, whose fireplace is shown at a.

Within the vessel B is an open pan or vessel, C, to contain the charge of moils, such vessel C having holes or perforations through its sides, in order to admit a liquid, when in the vessel B, to flow freely into such vessel C. A space, f, between the bottoms of the two vessels, answers to receive the fluor spar.

Within the furnace is a retort or generator, E, which communicates with the vessel B by a pipe, b. The said generator is for the purpose of generating fluoric gas separately from the vessel B, it being introduced into the latter vessel by the pipe b.

The generator is fitted with a stirrer or agitator, S, and the cover of each of the vessels, B and E, may be provided with a sand-or water-joint, where it rests on the said vessel.

Over the boiler B is a condenser, D, whose worm or pipe, d, communicates with or leads out of the vessel B, and terminates over the mouth of a pipe, e, which is arranged with and opens into the front end of the vessel B, in manner as represented. The condenser is to receive the vapors from the boiler B, and condense them and return them to the said boiler, the same being to prevent the waste of acid and fluorine, which would otherwise take place. The tube $z$ also serves to indicate the height of the fluid in the boiler, and for introducing either water or acid therein.

A crane, T, arranged by the side of the furnace, is intended for raising the vessel C out of or deposit it within the boiler, as circumstances may require. The tube or cistern, U, for containing water for cleansing the moils of the acid solution after being subjected to its action, may be arranged near to the furnace.

In using this apparatus for removing the metallic incrustations from glass or moils, a sufficient quantity of the fluor spar is to be laid on the bottom of the vessel B, after which the vessel C, charged with the moils, should be introduced within the boiler B, which should be supplied with water and acid, and afterward be closed. The furnace having been charged with fuel, and its charge fired, the liquid in the boiler will be heated. The combined action of the heat and acid will decompose the spar, and liberate the fluoric acid thereof, which will mix with the excess of sulphuric acid. The acids will soon remove the scale, and leave the glass free of it, after which the moils may be raised out of the liquor and thrown into the washing-cistern U, and there be cleansed of the acid solution which may adhere to them. Instead of the fluor spar being placed in the boiler B, the generator may be charged with it, and with sufficient quantity of acid and water, the vessel being supplied with water. The fluoric acid, in such case, will be found in the generator, and, with the sulphuric acid, makes its way into the boiler. From time to time the charge of the generator may be agitated by the stirrer S, which consists of a vertical shaft provided with wings and a handle, as represented in the drawings.

The generator is also specially useful for the production of fluoric-acid gas for introduction into the vessel B, and its water, when sand placed within such vessel is to be cleansed of metallic oxide. By putting a quantity of fluor spar and sulphuric acid in the generator, we can produce the fluoric acid, which will flow through the pipe $b$ into the vessel B, the water of which will absorb the acid.

The advantage of the generator is that its charge of spar may be removed from it without disturbing the tray C in the boiler.

We claim as our invention, the following, viz.:

The employment of heat and a weak solution of sulphuric or muriatic and fluoric acids, in manner substantially as described, for removal of the metallic oxide or scale from the "moils," or from the sand or silica used for making glass.

Also, for the purpose set forth, we claim the combination of the vessel or tray C with the boiler B and the furnace A.

Also, the combination, as well as the arrangement of the acid-generator E with the boiler B and the furnace A, the said boiler and generator being connected, as described.

Also, the combination of the condenser D with the boiler-furnace and the vessel C, or the same and the generator E.

WM. P. PARROTT,
JNO. J. BORDMAN.

Witnesses:
R. H. EDDY,
F. P. HALE, Jr.